April 26, 1960     H. G. McMAHON     2,933,959
PREDETERMINED TORQUE RELEASE HAND TOOL
Filed Oct. 8, 1957
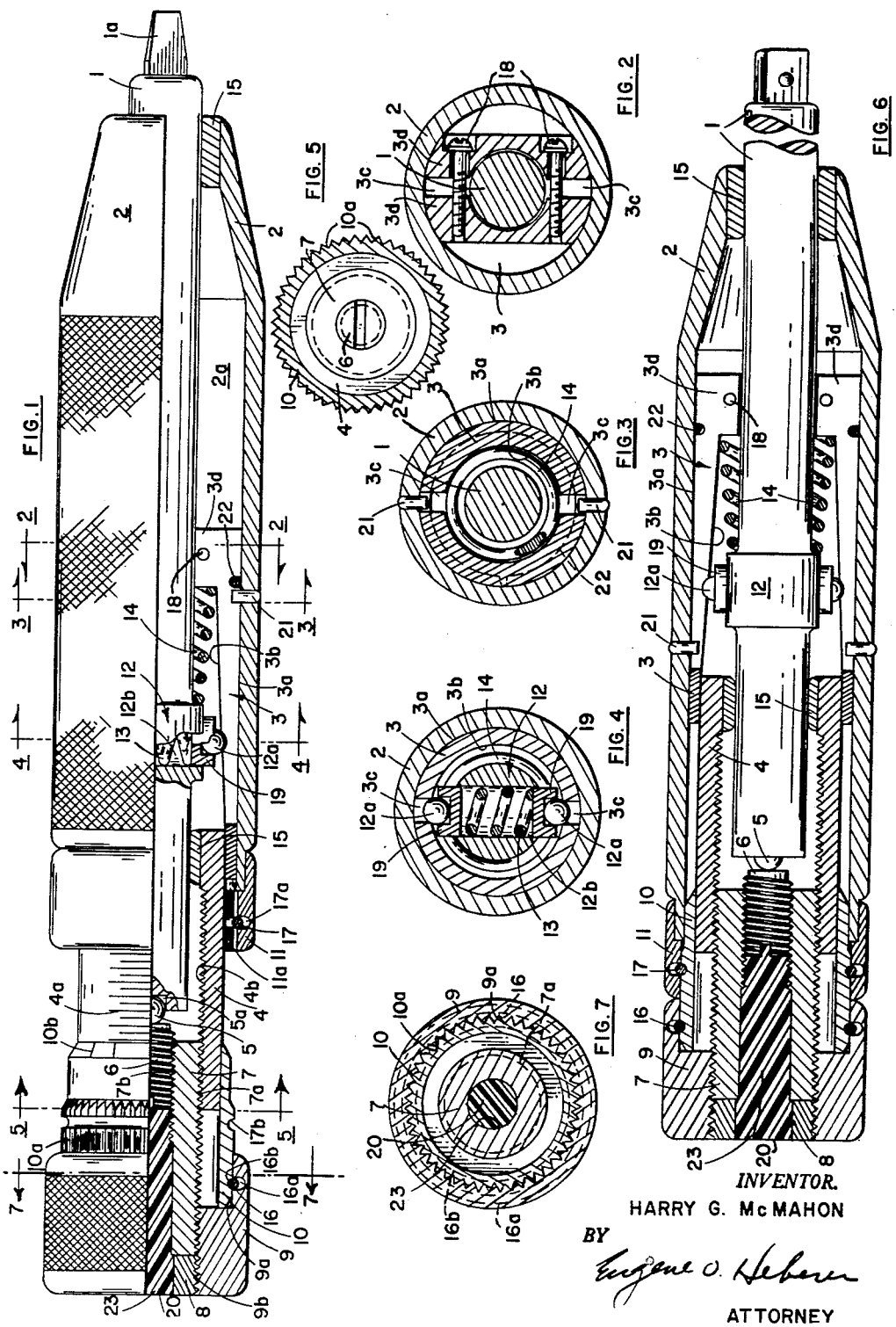
INVENTOR.
HARRY G. McMAHON
BY
Eugene O. Heberer
ATTORNEY

United States Patent Office 2,933,959
Patented Apr. 26, 1960

2,933,959

PREDETERMINED TORQUE RELEASE HAND TOOL

Harry G. McMahon, Arcadia, Calif.

Application October 8, 1957, Serial No. 688,873

15 Claims. (Cl. 81—52.4)

This invention relates to a torque transmitting tool and more particularly, to a hand operated adjustable screwdriver or wrench by which a predetermined torque may be applied to a work piece, such as a screw or bolt.

It is contemplated that the present invention will be particularly desirable for transmitting torque to screws over ranges of from 5 to 80 inch-ounces. Such ranges of inch-ounces may be achieved in, for example, a set of three screwdrivers or wrenches. According to the present invention when the proper torque has been applied to a screw, the screwdriver rod will slip within its housing and additional torque will not be applied to the screw.

This type of tool is especially desirable for use in the electronic industry where many small screws are used and where, if too much torque is applied, the work may either be damaged or ruined. In the operation of the present invention, the operator may make micrometer-type adjustments for any required torque within the capacity of the tool. A screwdriver or wrench may thereby transmit a preset amount of torque to the work without the risk of over or under torquing.

It is therefore an object of this invention to provide an improved torque transmitting tool.

It is a principal object of this invention to provide an adjustable torque transmitting tool which may be set within a specified range so as to transmit an exact amount of torque to the work.

It is a further object of this invention to provide an adjustable torque transmitting tool in which the torque transmitting or drive member slips within its housing after the predetermined torque has been applied to the work.

Other objects of this invention will become apparent from the following description taken in connection with the accompanying drawings, in which Fig. 1 is an embodiment of the invention in which one-half of a screwdriver is shown in cross section, the other half being shown in plan view, and in which the handle and adjustment means is withdrawn from the housing;

Fig. 2 is a view of the full cross section taken along the line 2—2 of Fig. 1;

Fig. 3 is a view of the full cross section taken along the line 3—3 of Fig. 1;

Fig. 4 is a view of the full cross section taken along the line 4—4 of Fig. 1;

Fig. 5 is a view of a full cross section taken along the line 5—5 of Fig. 1;

Fig. 6 is a cross sectional view of the invention in position for operation and having a drive tip adapted to receive a snap-on wrench; and Fig. 7 is a cross sectional view taken along the line 7—7 of Fig. 1.

Referring to Fig. 1, the invention is shown in the form of a screwdriver having a screwdriver tip 1a on the drive shank or rod 1 which is mounted for rotation in a sleeve bearing 15. On the right side of the drawing, one sleeve bearing 15 is fitted into screwdriver housing 2 and the other sleeve bearing 15 is fitted into the internal unthreaded portion of graduated barrel or sleeve 4. Housing 2 may be of general cylindrical shape and may be tapered at the driving end for convenience. The internal surface of housing 2 may be also cylindrical, and slidably engaged therein is sleeve or cam 3. Cam 3 is shown to have a generally cylindrical exterior surface for convenient sliding engagement with the cylindrical surface 2a and has a tapered interior surface 3b which is located to surround plunger assembly 12. Spring 14, surrounding shank 1 between the small diameter end of cam 3 and plunger assembly 12, may be used as an aid to hold the plunger assembly in position; however, it is not an absolute requirement.

Cam 3 is coupled radially to housing 2 by pins or screws 21 which may be secured into the housing 180 degrees apart, as is shown in Fig. 3. Pins 21 are slidably engaged in grooves or slots 3c which extend through the wall of cam 3, generally parallel to the axis of the cam and for a substantial length thereof. Cam 3 is thereby fixed to always rotate with housing 2 but is slidable in the elongated directions therein for the distance allowed according to the shape of the housing and limit stop ring 22. Stop ring 22 is fitted in the external surface of cam 3 adjacent one end thereof and restricts the movement of cam 3 toward the left in the drawing when it comes in contact with pins 21. Cam 3 can be moved to the right in the drawing to a point where the internal taper of the housing starts, or to the end of the slots which contact the pins.

Internal cam surface 3b forms the surface of an internal truncated-cone. At the small diameter end thereof is an adjustment means in which two screws 18 in sleeve end portion 3d may be tightened to decrease the width of the slots at the last-mentioned end of the cone or to increase it, as may be desired. This adjustment feature is more clearly shown in Fig. 2.

A transversely directed and extensible plunger assembly 12 is shown to be comprised of a spring 13 in a transverse passage 12b in shank 1. Transversely externally of spring 13 may be plunger cups or holders 19 in which a plunger 12a may be seated. The plunger cups 19 are shown to be cylindrical and have one end open so as to hold a plunger ball 12a, or to hold an elongated plunger of generally cylindrical shape, having a rounded end which may be engaged in slots or re-entrant portions 3c in cam 3. When plungers 12a are so engaged, shank 1 will rotate with housing 2.

When the tool is used, for example, as a screwdriver and a screw is tightened to a point where any additional torque applied will be greater than the force of spring 13 holding plungers 12a in slots 3c, then plungers 12a will slip out of grooves 3c. If the housing 2 is then continually rotated, shank 1 will remain stationary and the plungers will rotate along the tapered surface 3b of cam 3 and in and out of the slots until the operator stops rotating housing 2, which will be generally immediately because he will be able to detect the slipping of shank 1 within the housing.

Plungers 12a are shown more clearly in recesses or slots 3c in Fig. 4 and are in contact with the edge of the tapered surface 3b of the cam. They are in contact with surface 3b so that they can easily be rotated out of slots 3c when the resistance on the shank is greater than the force of spring 13. Slots 3c are shown spaced at 180 degrees but may be spaced at various angles and may be increased in number as desired.

In Fig. 1, barrel 4 and handle 9 are shown withdrawn from their closed position with housing 2, slots 3c having been moved on pins 21 until the latter contacted stop ring 22. The handle and barrel are so withdrawn to set the position of plungers 12a against cam surface 3b and more specifically, in slots 3c to adjust the holding force of the spring according to the predetermined amount desired to be applied with shank 1 on the work piece. The torque adjustment means in the handle end is shown to be comprised generally of an internal sleeve 7, having its external threads 7a engaged with the internal threads 4b of barrel 4. Sleeve 7 has internal threads 7b which are engaged with rough adjustment screw 6. Screw 6 is in abutment with a bearing member or ball 5 which may be carried in a recess 5a in the end of shank 1. Bearing member 5 may also be in the form of a smooth ended cylinder which would be adapted for easy rotation against the end of shank 1. The external threads of sleeve 7 are also engaged with internal threads 9b of handle 9. Sleeve 7 can thereby be locked in any desired position of adjustment with locking nut 8 in the end of handle 9.

The thimble 10 has external serrations 10a which are snugly but slidably engaged in an enlarged internal diameter portion of the handle 9 which has serrations 9a, shown in Fig. 7, complementary to those on thimble 10. Snap ring 16 is fitted into grooves 16a and 16b in handle 9 and thimble 10, respectively, so that the thimble may be dissassembled from the handle 9 and reassembled without losing its axial position in handle 9. The groove 16a in handle 9 is wide enough and deep enough to house the entire ring 16 which has a diameter equal to that of thimble 10. Groove 16b on thimble 10 has the depth of approximately one-half the diameter of the cross section of the ring. When the thimble is pressed into serrated surface 9a of the handle, the snap ring 16 deflects into groove 16a until groove 16b is mated therewith. At this point the ring snaps into the thimble groove. As groove 16b is only deep enough to house half of ring 16, the other half must remain in handle groove 16a. This locks the two axially or longitudinally and the aforesaid serrations lock the thimble and the handle radially. The relationships of the thimble, barrel, adjusting sleeve, and rough adjusting screw are also shown in Fig. 5.

In Fig. 6, the handle and barrel are shown moved to the right so that the handle is locked with the housing. This is made possible by means of lock sleeve 11 which is secured at the right end thereof onto housing 2 and which is serrated on a smaller internal diameter portion to fit onto the external serrations 10a on thimble 10. The inside diameter of lock sleeve 11 has groove 17a cut into serrated surface 11a to a depth sufficient to house the entire diameter of snap ring 17. A groove 17b is shown on the outside diameter of thimble 10 and is adapted to mate with groove 17a. Snap ring 17 is easily snapped in and out of groove 17b when the serrations of the sleeve and thimble are properly aligned.

Graduations 4a on the external surface of barrel 4 are spaced according to the pitch of threads 4b on its internal surface; that is, for example, for a 32 pitch thread the graduations will be spaced at a multiple of or an even division of 32. Thimble 10 has radial graduations 10b, as on a micrometer, to mate with the graduations 4a on the barrel.

In manufacture, the initial setting or adjustments may be made by rotating the handle-thimble assembly in Fig. 1 until the thimble graduations in conjunction with those on the barrel indicate the lowest torque setting of the tool. For this low torque setting, sleeve 7 is located in a definite position with respect to barrel 4 and handle 9. At this setting, the plungers 12 should be in contact with a larger diameter portion of conical surface 3b and in engagement with slots 3c. When this setting, which fixes the low end of the torque range, is completed, handle 9 is locked to adjusting sleeve 7 by means of locking plug 8. Then coarse adjusting screw 6 may be rotated by means of a screwdriver to move shank 1 to the right or left in housing 2 and so as to move plungers 12a to that portion of the slots where the spring pressure on the plungers is equal to the lowest torque setting for the tool. Handle 9 is then rotated or dialed forward to the right in Fig. 1 to the highest torque setting on barrel 4. During this operation, sleeve 7 and coarse adjusting screw 6 rotate with handle 9 in barrel 4. If screw 6 fails to rotate simultaneously with sleeve 7, it can be made to do so with a screwdriver through passage 23.

If the wrench or screwdriver does not register properly at this setting, the width of slots 3c in cam 3 may be varied by use of the fine adjustment screws 18 in end portion 3d. Widening the slots increases the torque setting and narrowing them decreases it. Adjustments at the high and low ends are repeated until the tool registers accurately at both extremes of the range. At this stage the tool, being linear, is accurate for all readings, and the settings of screws 6 and 18 are substantially permanent.

Passage 23 within handle 9, formed in part by the interior of sleeve 7 and by the internal surface of locking plug 8, extending inward to screw 6, may be filled with a hard setting plastic or metal alloy 20 to prevent the entry of foreign material and the maladjustment of screw 6. Passage 23 may also be filled with a locking screw which would be more easily removable than a plastic or low melting alloy.

Then, in operation when a desired torque within the range of the tool is to be set so that it may be applied to a work piece; that is, for example, when a screw is to be tightened to a predetermined amount of torque, such amount is set by adjusting the tool. This is done by pulling the handle away from the housing so as to cause groove 17b to slip off of the snap ring 17 and withdrawing the barrel from the housing. Then, the thimble is rotated until the graduations 10b read properly with the desired amount of torque indicated on the graduations 4a on the surface of the barrel. At this point the handle is then pushed back toward the housing and thimble 10 is re-engaged by snap ring 17. The serrations 10a are located radially to put them in alignment on any dial reading desired.

It can be readily seen that the tool can be adjusted for any desired amount of torque within its range and then, it may be applied to rotate a screw or nut so that only the proper amount of torque is exerted on it. The operator rotates housing 2 until it slips on shank 1 and he then will realize that the screw, for example, has been tightened the proper amount.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An adjustable torque transmitting tool comprising an elongated driven means having a work engaging member at one end thereof, an elongated generally cylindrical housing surrounding said driven means and being substantially concentric therewith, cam means having an internal tapered surface and having an external surface being slidably engaged within said housing, said cam means being connected against rotation within said housing, said driven means being concentrically within said cam means, reentrant portions in said tapered surface elongated in the direction of the axis of said housing, said reentrant portions being substantially coextensive with said tapered surface, extensible means extending transversely from said driven means so as to be engageable in said reentrant portions, said extensible means being in contact with said tapered surface adjacent said reentrant portions when in said engagement, stored energy means within said driven means to force said extensible means toward said housing and to hold said last-mentioned means in engagement in said reentrant portions with a predetermined force, and adjustment means adjacent the other end of said driven means and secured to said housing, said adjustment means being connected to move said extensible means in the elongated direction in said reentrant portions so as to reduce or increase the predetermined force holding said last-mentioned means in said engagement.

2. An adjustable torque transmitting tool comprising an elongated driven means having a torque applying tip at one end thereof, an elongated generally cylindrical housing surrounding said driven means, said driven means being bearing mounted in said housing, an internal conical-shaped cam surface forming a section of the internal surface in a sleeve, said sleeve being slidably engaged in and secured against rotation in said housing, said driven means being concentrically within said sleeve, slot means in said cam surface elongated in the direction of the axis of said housing, said slot means being substantially coextensive with said conical surface, extensible means extending transversely from said driven means so as to be engageable in said slot means, said extensible means being in contact with said conical surface adjacent said slot means when in said engagement, stored energy means within said driven means to force said extensible means toward said housing and to hold said last-mentioned means in engagement in said slot means with a predetermined force, and adjustment means adjacent the other end of said driven means and secured to said housing, said adjustment means being connected to move said extensible means in the elongated direction in said slot means so as to reduce or increase the predetermined force holding said last-mentioned means in said engagement.

3. An adjustable torque transmitting tool comprising an elongated driven means having a torque applying tip at one end thereof, an elongated generally cylindrical housing surrounding said driven means, said driven means being bearing mounted in said housing, an inwardly directed conical-shaped cam in a sleeve, said sleeve having a generally cylindrical exterior and being slidably engaged in said housing, said sleeve being held against rotation in said housing, said driven means being concentrically within said sleeve, elongated slots spaced in said cam and extending therethrough generally parallel to the axis of said housing, said slots being substantially coextensive with said conical surface, plunger means extending transversely from said driven means so as to be engageable in said slots, said plunger means being in contact with said conical surface adjacent said slots when in said engagement, transversely directed spring means in said driven means forcing said plunger means toward said housing and connected to hold said last-mentioned means in engagement in said slots with a predetermined force, first adjustment means adjacent the other end of said driven means and secured to said housing for slidable engagement therewith, said first adjustment means being connected to move said plunger means in the elongated direction in said slots so as to reduce or increase the predetermined force holding said last-mentioned means in said engagement, and second adjustment means adjacent the small diameter end of said cam to finely adjust said predetermined force adjacent said small diameter.

4. An adjustable torque transmitting tool comprising an elongated rod having a torque applying tip at one end thereof, an elongated generally cylindrical housing surrounding a portion of said rod, said rod being bearing mounted in said housing, a cam of internal conical shape in a sleeve, said sleeve having a generally cylindrical exterior wall complementary to the interior wall of said housing, said sleeve surrounding a portion of said rod, elongated slots spaced in said cam and extending therethrough generally parallel to the axis of said housing, plunger means extending transversely from said rod so as to be engageable in said slots, and rotatable in said sleeve to move out of said slots, a transversely directed spring in said rod forcing said plunger means toward said housing and connected to hold said last-mentioned means in engagement in said slots with a predetermined force, first adjustment means adjacent the other end of said rod and secured to one end of said sleeve, said sleeve being slidably engaged in said housing on pins extending into said slots and secured in said housing, said first adjustment means being withdrawable from said housing, said first adjustment means being connected to move said plunger means in the elongated directions in said slots so as to reduce or increase the predetermined force holding said last-mentioned means in said engagement according to the varying diameters of said cam, and second adjustment means adjacent the small diameter end of said cam to finely adjust said predetermined force adjacent said small diameter.

5. An adjustable torque transmitting tool comprising an elongated rod having a torque applying tip at one end thereof, an elongated generally cylindrical housing surrounding a portion of said rod, said rod being bearing mounted in said housing, a cam of internal conical shape in a first sleeve surrounding a portion of said rod, said first sleeve having a generally cylindrical exterior wall complementary to the interior wall of said housing, elongated slots spaced in said cam extending through said first sleeve and being generally parallel to the axis of said housing, plunger means extending transversely from a transverse passage in said rod so as to be engageable in said slots and rotatable in said first sleeve to move out of said slots, a transversely directed spring in said passage forcing said plunger means toward said housing and connected to hold said last-mentioned means in engagement in said slots with a predetermined force, a second sleeve secured to said first sleeve adjacent the other end of said rod, said first sleeve being slidably engaged in said housing on pins extending into said slots and secured in said housing, said second sleeve being withdrawable from said housing as said first sleeve slides on said pins, said second sleeve being internally bearing mounted at one end thereof on said other end of said rod and being internally threaded in the direction away from said rod, a third sleeve having external and internal threads and having said external threads adjacent one end thereof engaged with said threads of said second sleeve adjacent said other end thereof; an open-ended, generally cylindrical handle threadedly engaged toward one end thereof and toward said rod with said external threads adjacent said other end of said third sleeve; said internal threads of said third sleeve being engaged at said one end thereof with a screw having one end thereof in contact with a spacer means, said spacer means being in contact with said other end of said rod, and a locking nut threadedly engaged in the other end of said handle for abutment with said other end of said third sleeve.

6. An adjustable torque transmitting tool according to claim 5 in which said second sleeve has graduations on the external surface thereof, a generally cylindrical thimble being slidably engaged at one end thereof on the external surface of said second sleeve at the other end thereof, said thimble being snap-fit at its other end into handle adjacent its one end, said thimble being external of said third sleeve, said thimble having a graduation on the external surface of said one end, said graduations being complementary to the graduations on the external surface of said second sleeve, said thimble having an in-and-out snap locking means engageable with the other end of said housing.

7. An adjustable torque transmitting tool according to claim 6 in which said graduations on said second sleeve are spaced to correspond with the pitch of said threads of said second sleeve, and in which said screw may be rotated in said third sleeve to move said rod in the direction of said one end thereof.

8. An adjustable torque transmitting tool according to claim 7 in which the small diameter end of said cam may be moved radially outward from and radially inward toward said rod, and a spring surrounding said rod within said cam being in abutment with a transverse inwardly directed surface within said first sleeve adjacent the small diameter end of said cam and a transverse outwardly directed surface on said rod to hold said plunger means in the direction away from said small diameter end of said cam.

9. An adjustable torque transmitting tool comprising an elongated driven means having a torque applying tip at one end thereof, an elongated generally cylindrical housing surrounding said driven means, said driven means being bearing mounted in said housing, a first sleeve having an internal conical-shaped cam surface within said housing and surrounding a portion of said driven means, slot means in said cam surface elongated in the direction of the axis of said housing, said slot means being substantially coextensive with said conical surface, extensible means extending transversely from said driven means so as to be engageable in said slot means, said extensible means being in contact with said conical surface adjacent said slot means when in said engagement, stored energy means within said driven means to force said extensible means toward said housing and to hold said last-mentioned means in engagement in said slot means with a predetermined force, a second sleeve secured to said cam surface adjacent the other end of said driven means, said first sleeve being slidably engaged in and secured against rotation in said housing, said second sleeve being withdrawable from said housing as said first sleeve slides within said housing, said second sleeve being internally bearing mounted at one end thereof on said other end of said driven means and being internally threaded in the direction away from said driven means, a third sleeve having external and internal threads and having said external threads adjacent one end thereof engaged with said threads of said second sleeve adjacent said other end thereof; an open-ended, generally cylindrical handle threadedly engaged toward one end thereof and toward said driven means with said external threads adjacent said other end of said third sleeve, said internal threads of said third sleeve being engaged at said one end thereof with a screw having one end thereof in contact with a spacer means, said spacer means in contact with said other end of said driven means, and a locking nut threadedly engaged in the other end of said handle in abutment with said other end of said third sleeve.

10. An adjustable torque transmitting tool according to claim 5 in which said second sleeve has graduations on the external surface thereof, a generally cylindrical thimble being slidably engaged in one end thereof on the external surface of said second sleeve at the other end thereof, said thimble being engaged at its other end in said handle adjacent its one end, said thimble having external serrations, said handle having external serrations adjacent its one end complementary to those on said thimble, a first snap ring fitted into matching grooves on said handle and said thimble so as to hold said handle in a snap fit assembly, said thimble being external of said third sleeve, said thimble having graduations on the external surface of said one end, said graduations being complementary to the graduations on the external surface of said second sleeve, a lock sleeve secured on the other end of said housing and having internal serrations complementary to the external serrations of said thimble, a second snap ring fitted in said internal surface of said lock sleeve, said thimble having a peripheral groove complementary to said snap ring in said lock sleeve, said snap rings and serrations being adapted to lock said thimble and said housing radially and axially.

11. A torque transmitting tool comprising an elongated driven means having a work engaging member at one end thereof, an elongated cylindrical housing surrounding said driven means and being substantially concentric therewith, said one end of said driven means extending adjacent a corresponding end of said housing for engaging the work, means within said housing having reentrant portions in an interior surface thereof, said driven means being concentrically within said last-mentioned means, extensible means extending transversely from said driven means so as to be engageable in said reentrant portions, and stored energy means within said driven means extending transversely to force said extensible means toward said housing and to hold said last-mentioned means in engagement in said reentrant portions with a predetermined force.

12. A torque transmitting tool comprising an elongated driven means having a work engaging member at one end thereof, an elongated generally cylindrical housing surrounding said driven means and being substantially concentric therewith, means within said housing having reentrant portions in an interior surface thereof, said driven means being concentrically within said last-mentioned means, plunger means extending transversely from a transverse passage in said driven means so as to be engageable in said reentrant portions, and a transversely directed spring in said passage forcing said plunger means toward said housing and connected to hold said last-mentioned means in engagement in said reentrant portions with a predetermined force.

13. A torque transmitting tool comprising an elongated driven means having a work engaging member at one end thereof, an elongated generally cylindrical housing surrounding said driven means and being substantially concentric therewith, said one end of said driven means extending adjacent a corresponding end of said housing for engaging the work, cam means having an internal tapered surface and having an external surface being slidably engaged with said housing, said cam means being secured against rotation within said housing, said driven means being concentrically within said cam means, reentrant portions in said tapered surface, extensible means extending transversely from said driven means so as to be engageable in said reentrant portions, said extensible means being in contact with said tapered surface adjacent said reentrant portions when in said engagement, and stored energy means within said driven means to force said extensible means toward said housing and to hold said last-mentioned means in engagement in said reentrant portions with a predetermined force.

14. A torque transmitting tool comprising an elongated rod having a work engaging member at one end thereof, an elongated externally generally cylindrical means surrounding said rod and being substantially concentric therewith, said one end of said rod extending adjacent a corresponding end of said cylindrical means for engaging the work, reentrant portions in the interior surface of said cylindrical means, plunger means extending transversely from a transverse passage in said rod so as to be engageable in said reentrant portions, and a transversely directed spring in said passage forcing said plunger means toward said cylindrical means and connected to hold said plunger means in engagement with said reentrant portions with a predetermined force.

15. A torque transmitting tool comprising an elongated rod having a torque applying tip at one end thereof, an elongated externally cylindrical means surrounding said rod and being substantially concentric therewith, said tip extending outwardly of said cylindrical means, reentrant portions in an interior surface of said externally cylindrical means, extensible means extending transversely from said rod so as to be engageable in said reentrant portions, and stored energy means within said rod extending transversely to force said extensible means toward said cylindrical means and to hold said extensible means in engagement in said reentrant portions with a predetermined force.

References Cited in the file of this patent

UNITED STATES PATENTS

| | | | |
|---|---|---|---|
| 626,227 | Gaylor | June 6, | 1899 |
| 873,424 | Greene | Dec. 10, | 1907 |
| 1,127,022 | Knight | Feb. 2, | 1915 |
| 1,186,325 | Metzger | June 6, | 1916 |
| 2,157,574 | Siesel | May 9, | 1939 |
| 2,441,038 | Siesel | May 4, | 1948 |
| 2,753,702 | Dunn | July 10, | 1956 |
| 2,771,804 | Better et al. | Nov. 27, | 1956 |
| 2,786,377 | Riess | Mar. 26, | 1957 |

FOREIGN PATENTS

| | | | |
|---|---|---|---|
| 233,207 | Great Britain | May 7, | 1925 |
| 488,748 | Canada | Dec. 9, | 1952 |
| 697,021 | Great Britain | Sept. 16, | 1953 |